INVENTOR.
BEN R. HALLFORD
BY
Moody & Anderson
AGENTS

June 25, 1968 B. R. HALLFORD 3,390,349

METHOD AND MEANS FOR TUNING KLYSTRON FOR OPTIMUM MODULATION LINEARITY

Filed Jan. 11, 1967 2 Sheets-Sheet 2

INVENTOR.
BEN R. HALLFORD

BY Moody & Anderson
AGENTS

United States Patent Office 3,390,349
Patented June 25, 1968

3,390,349

METHOD AND MEANS FOR TUNING KLYSTRON FOR OPTIMUM MODULATION LINEARITY

Ben R. Halford, Richardson, Tex., assignor to Collins Radio Company, Cedar Rapids, Iowa, a corporation of Iowa Filed Jan. 11, 1967, Ser. No. 608,563
9 Claims. (Cl. 331—44)

ABSTRACT OF THE DISCLOSURE

A method of tuning a reflux klystron by repeller voltage settings and power meter monitoring to arrive at operation at the linearity center of the frequency versus repeller voltage characteristic. A potentiometer and switch circuitry is included between a repeller voltage source and the klystron repeller electrode which permits selective adjustment of repeller voltage for maximum power and for equal lesser power levels either side of maximum within the mode, together with automatic selection of a repeller voltage which is the mean of the two repeller voltages effecting the lesser power levels. The tuning system is based on an analysis of reflux klystron frequency and power output versus repeller voltage characteristics which substantiate that a repeller voltage which is the mean of those repeller voltages establishing equal fractional power levels either side of maximum power optimizes tuning at the linearity center of the frequency characteristic.

This invention relates generally to reflux klystron tuning methods and more particularly to a method of optimizing the tuning of a reflex klystron to obtain optimum mode linearity together with implementation means for readily affecting optimum mode linearity tuning by klystron repeller voltage adjustment procedure.

The reflex klystron is tunable in frequency over several modes of oscillation. The tube cavity may be tuned to vary frequency so as to, for example, arrive at oscillation in a given mode with a selected repeller voltage range. The repeller electrode of the klystron is provided with a negative voltage potential the magnitude of which causes the frequency of the oscillator within a mode to vary within the mode in a proportional though not linear manner. Unfortunately, the power output of the klystron rises to a peak within a particular oscillating mode which is not coincident with the center of the linear portion of the frequency versus repeller voltage characteristic. The power output function throughout the mode is not symmetrical and the frequency versus repeller voltage function is not a linear relationship throughout the mode but varies in the manner of an S curve relationship.

When reflex klystrons are employed in communication systems such as in microwave systems, the klystron frequency may be modulatd in frequency by a variation of the repeller voltage about a mean repeller voltage setting by a modulating voltage such that information may be transmitted as frequency modulation of the klystron about a given center frequency. In such systems it is necessary that the klystron operate with optimum mode linearity in order that optimum modulation characteristics may be realized and that intermodulation distortion may be accordingly minimized. In order that operation be affected at the linearity center, the main repeller voltage center must be set at the center of the mode linearity characteristic.

Current known tuning methods might generally be termed power tuning methods in that the repeller voltage is adjusted for maximum power output. Since this particular tuning method, for reasons to be more fully analyzed, results in operation removed from the center of the linear function as concerns operating frequency, the repeller voltage is generally backed off from the maximum power setting for the best linearity (best modulation characteristic) in a "cut and try" method.

A further known klystron tuning method, while more effective and exacting, is undesirable because of complexity, and involves loading a transmitting-receiving link with noise and measuring intermodulation distortion. The klystron voltage is set for minimum intermodulation. This latter approach necessitates the disablement of a particular operating channel, requires special complex type equipment and more disadvantageously, requires an operator at each end of the transmitting and receiving link.

The present invention is accordingly directed towards simplification of klystron tuning by the provision of a simple one-man adjustment procedure at the transmitter end of the link which requires no external test equipment and by means of which operation at linearity center may be effected in an expedient manner.

The significance of operation at the linearity center is amplified by the current practice of employing a linearizer for klystrons used in frequency modulation systems. By use of external controlled impedances, the linearity function (frequency versus repeller level) may be broadened out from the center of the linear range in both directions. In order to linearize, however, it is imperative that the center of the linearity function be known and that the repeller voltage be precisely set at this center point. If operation at the linearity center point is not set, linearizers are not effective.

The present invention thus advantageously provides a simple means for assuring operation at the linear center so that linearizing techniques may be effective in accomplishing their purpose.

These and other objects and features of the invention will become apparent upon reading the following description in conjunction with the accompanying drawings in which.

Figure 1:
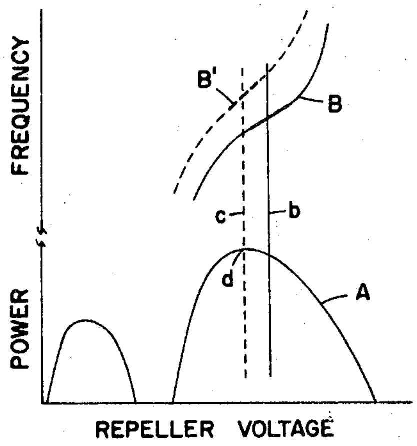
FIGURE 1 is a diagrammatic representation of typical power and frequency versus repeller voltage characteristics of a reflex klystron.

The significance of tuning to linearity center of a klystron operating mode is shown diagrammatically in FIGURE 1 in which power output and frequency versus repeller voltage operating characteristics for a typical klystron operating mode are shown. Note that the power function, curve A, is not symmetrical through the mode and that peak power (point *d*) does not occur at a repeller voltage which corresponds to the linearity center of the frequency versus repeller voltage curve B. The vertical line *c* which extends through the power function A at the point of maximum power is seen to intersect the frequency characteristic B to one side of the linearity center. Vertical line *b* extending through the linear center of the frequency curve likewise is seen to intersect the power curve at a point removed from the maximum power point *d*. Optimum operation of course, would be defined by the situation where maximum power coincides with the center of linearity. This is rarely the case. The ideal situation would be depicted by the dashed frequency plot, curve B'.

With a klystron having characteristics as depicted in FIGURE 1, if repeller voltage were set for a peak power indication, poor linearity would result since operation would be at the knee of the frequency versus repeller voltage function and frequency modulation of the klystron about this point would introduce distortion.

The present invention permits a repeller voltage setting to be made which effects operation at the linearity center, the importance of which justifies a slight trade-off as concerns peak power operation. Power output may generally be read directly from a panel meter and tuning to peak power is a simple operation.

The present invention relates to an analysis of the power versus frequency function of reflex klystrons, in order that the same power indicating meter may be employed to arrive at operation in the linearity center of the frequency function. Thus, a further analysis of the power function and the linearity function of typical reflex klystrons is in order.

Figure 2:
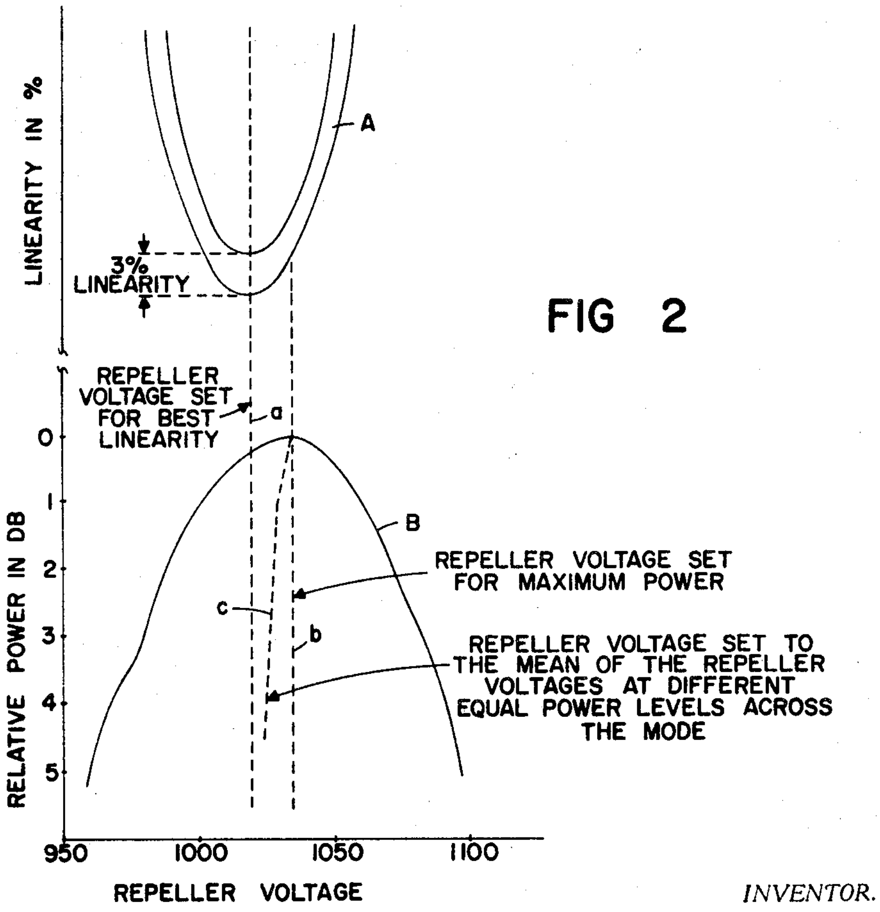
FIGURE 2 is a plot from actual data of typical power output and percentage linearity characteristics, each as a function of repeller voltage.

FIGURE 2 is a plot from actual data which shows the effect of repeller voltage adjustment on the tuning of a type QKK 754–A 1-watt reflex klystron as employed in microwave communication carrier equipment.

Relative power in decibels is plotted against repeller voltage (curve B). Percentage linearity is plotted against repeller voltage (curve A). The percent linearity function of FIGURE 2 is actually an oscillogram from a test set which visually shows percentage linearity versus repeller voltage. Two traces are shown to provide a linearity calibration such that one trace is displaced from the other by a predetermined percentage. A three percent separation is illustrated. The bottom of the percent linearity curve represents linearity center. Dashed line *a* of FIGURE 2 is drawn through the linearity center, and is seen to intersect the power curve B at a point removed from maximum power. As previously discussed, the present invention relates to a manner of tuning by repeller voltage adjustment to arrive at a repeller voltage setting more nearly coincident with the center of the linearity function.

Dashed line *b* of FIGURE 2 is drawn through the maximum power point and is seen to intersect the linearity curve A at a point removed from the linearity center. Dashed line *c* of FIGURE 2 is a constructed line drawn through points representing the median of repeller voltage readings at different equal power levels across the mode. Thus, any point on line *c* represents the mean of repeller voltages effecting a particular power output level on either side of the maximum power level. From this relationship it may be observed that the mean repeller voltage as depicted by line *c* extends asympototically from the maximum power point of curve B to the line *a* which represents the center of linearity in the mode. Line *c* very nearly coincides with the linear center defined by line *a* at a repeller voltage setting corresponding to the mean of those repeller voltages which establish power levels 6 db or more down from maximum on either side of maximum power. Thus, rather than use an external test set to obtain data for linearity center, the end may be accomplished by simple means on hand; namely, setting the repeller voltage level to the mean of those settings which establish power levels which are 6 db down on either side of maximum power.

When the power monitoring meter on the equipment panel is a linear reading device using square-law crystal detector means, the 6 db power points may be readily located by adjusting the power to one-fourth the maximum power reading.

The present invention then contemplates repeller voltage settings to arrive at power outputs at 6 db power points either side of maximum together with simple means by which the mean or average of these two repeller voltages may be established. The average of repeller voltage settings corresponding to power levels 6 db down either side of the maximum, from previous discussion, defines a repeller voltage setting very nearly coincident with the center of linearity within an operating mode. Extensive data on numerous reflux klystrons indicates this relationship to exist. It might be noted, with reference to FIGURE 2, that any repeller voltage setting between that corresponding to maximum power and those corresponding to the mean of repeller voltages affecting equipment power level on either side of maximum, results in operation more nearly about the linearity center. It might also be noted that while certain tubes under certain operating modes may operate a maximum power coincident with linearity center, the tuning means as outlined in the present invention will likewise arrive at the optimum setting.

Figure 3:
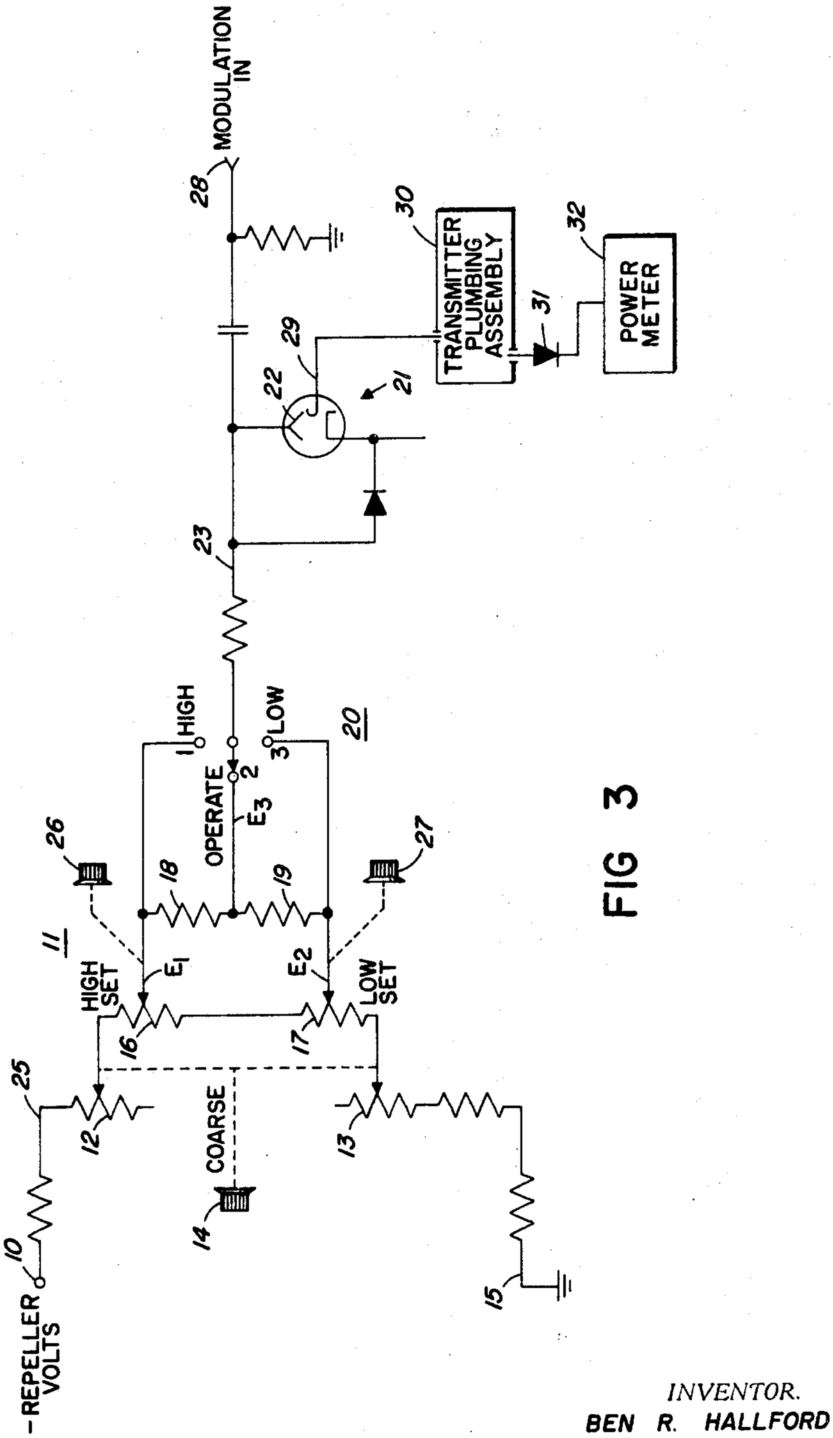
FIGURE 3 is a functional schematic diagram of a repeller voltage tuning circuitry which may be employed in implementing the tuning method of the present invention.

The manner in which the present invention may be implemented is illustrated in the functional schematic diagram of FIGURE 3. FIGURE 3 represents a reflux klystron generally designated by reference numeral 21. The repeller electrode 22 of klystron 21 is connected to a line 23 upon which a mean repeller voltage is to be set. The repeller 22 is additionally connected, as in a typical frequency modulated system, to a source of modulation voltage 28 by means of which the mean repeller voltage, as supplied on line 23, may be varied such that the klystron is frequency modulated with some desired intelligence as defined by the modulation voltage 28. An output probe 29 from the klystron 21 is connected to the transmitter "plumbing" assembly 30. A second probe from the plumbing assembly 30 is coupled through a diode detector 31 to a power meter as is typical in microwave systems.

The mean repeller voltage on line 23, as applied to the repeller electrode 22 of the klystron is, in accordance with the present invention, defined by the settings of certain potentiometers in conjunction with a repeller voltage source 10. The potentiometer circuitry 11 in conjunction with a three position switch 20 implements the tuning method of the present invention. The repeller voltage supply 10 is applied to the potentiometer arrangement 11 between point 25 and common ground 15. A pair of ganged potentiometers 12 and 13 allow a coarse setting of repeller voltage by means of an adjustment knob 14. This adjustment may be utilized to set the repeller for maximum power output. The wiper arms of potentiometers 12 and 13 are connected respectively to first resistive element ends of potentiometers 16 and 17, the other ends of which are connected in common. The coarse setting for maximum power would be adjusted with the wiper arms of potentiometers 16 and 17 turned to the "center" position such that the maximum value of the resistance of these potentiometers is in circuit between the wiper arms of potentiometers 12 and 13 and 16 and 17, respectively. The wiper arms of potentiometers 16 and 17 are shunted by serially connected first and second equal resistor members 18 and 19 with the junction of resistors 18 and 19 connected to terminal 2 of switch 20. The wiper arms of potentiometers 16 and 17 are connected to terminals 1 and 3 respectively of switch 20.

The coarse set knob 14 may then be adjusted for maximum power output from the klystron as indicated on power meter 32 with the switch 20 placed in the "operate" position, position 2. With the switch 20 in "high" position 1, the potentiometer 16 may be adjusted by means of control knob 26 to increase the repeller voltage setting to that point at which the power output, as read on meter 32, is one-fourth the maximum reading. This setting corresponds to a power output 6 db down from maximum on the "high" side of maximum power within the mode. Switch 20 may then be placed in position 3 and potentiometer 17 adjusted by means of control 27 to likewise attain a power output indication which is one-fourth that of the maximum reading to correspond to a power output 6 db down from maximum on the "low" side of maximum power. Switch 20 may then be reset to the "operate" position 2 to automatically establish a mean repeller voltage on line 23 corresponding to the mean of the repeller voltages which affected power outputs 6 db down on the high and low sides of maximum. The system is then adjusted for operation at the linearity center in accordance with the above described considerations.

The potentiometer arrangement 11 in conjunction with equal resistors 18 and 19 establish the desired mean repeller voltage since $E_3$, the voltage at the junction of resistors 18 and 19, and $E_1$ and $E_2$, the respective voltages on the wiper arms of the high set potentiometer 16 and the low set potentiometer 17, are related by the relationship, $$E_3=\frac{E_1+E_2}{2}$$

The present invention is thus seen to define a tuning method and implementation means by which a reflex klystron may be tuned for linearity center in an expedient manner by making repeller voltage adjustments, and reading particular power output levels. The voltage tuning method outlined here may be utilized readily by a single operator and requires no external test equipment.

Although the present invention has been described with respect to a particular embodiment thereof it is not to be so limited as changes might be made therein which fall within the scope of the present invention as defined in the appended claims.

I claim:

1. In a system including a reflex klystron and means for adjusting the repeller voltage applied to said klystron to effect variation in power output and operating frequency, and including means for monitoring power output of said klystron, means for adjusting the repeller voltage level to effect operation optimally near the linearity center of the frequency versus repeller voltage characteristic of said klystron comprising; first manual adjustment means for selectively setting and applying to said repeller a first repeller voltage in response to which maximum power output is effected, second manual adjustment means for selectively setting and applying to said repeller a second repeller voltage level in excess of that corresponding to said maximum power in response to which a predetermined fraction of said maximum power output is effected, third manual adjustment means for selectively setting and applying to said repeller a third repeller voltage level less than that corresponding to said maximum power output in response to which a like predetermined fraction of said maximum power output is effected, means for developing and applying to said repeller a fourth repeller voltage level corresponding to the mean of said second and third levels, and means selecting on operating repeller voltage corresponding to the mean of those repeller voltage levels set by said second and third manual adjustment means.

2. A tuning system as defined in claim 1 wherein said first manual adjustment means comprises a source of selectively variable repeller voltage, said second and third manual adjustment means comprising respective first and second potentiometers the respective resistive elements of which are serially interconnected across said source of selectively variable repeller voltage, said wiper arms being shunted by serially interconnected first and second like resistors, and switching means connected in circuit and to the repeller electrode of said reflex klystron for selectively connecting to said repeller electrode the junction between said first and second resistors, the wiper arm of said first potentiometer and the wiper arm of said second potentiometer, respectively.

3. A tuning system as defined in claim 2 wherein said first manual adjustment means further comprises third and fourth potentiometers first ends of which are connected to the respective terminals of said repeller voltage supply source, the wiper arms of said third and fourth potentiometers being connected respectively to those ends of said first and second potentiometers not connected in common, and means for effecting a like adjustment of the wiper arm positions of said third and fourth potentiometers to effect like impedances between the wiper arms thereof and the respective connected ends thereof.

4. A tuning system as defined in claim 3 wherein said switching means comprises a three-position make-before-break switch.

5. A tuning system is defined in claim 1 wherein said predetermined fractional power levels are selected as those levels which are at least six decibels down from said maximum power level.

6. A tuning system as defined in claim 2 wherein said predetermined fractional power levels are selected as those levels which are at least six decibels down from said maximum power level.

7. A tuning system as defined in claim 3 wherein said predetermined fractional power levels are selected as those levels which are at least six decibels down from said maximum power level.

8. A tuning system as defined in claim 4 wherein said predetermined fractional power levels are selected as those levels which are at least six decibels down from said maximum power level.

9. A tuning system as defined in claim 8 wherein said means for monitoring output power comprises a square law detector the output of which is monitored by a meter, said power levels six decibels down from maximum power being effected by an adjustment of said first and second potentiometers for meter indications corresponding to one-fourth of the maximum power indication as read on said meter.

References Cited

FOREIGN PATENTS 538,737 3/1957 Canada.

ROY LAKE, *Primary Examiner.*

S. H. GRIMM, *Examiner.*